United States Patent [19]
Arcuri et al.

[11] Patent Number: 6,121,968
[45] Date of Patent: Sep. 19, 2000

[54] ADAPTIVE MENUS

[75] Inventors: Michael P. Arcuri, Seattle; Thomas Scott Coon, Kirkland; Jeffrey J. Johnson, Bellevue; Alexis Warren Jacob Manning, Redmond; Martijn Eldert van Tilburg, Seattle, all of Wash.

[73] Assignee: Microsoft Corporation, Redmond, Wash.

[21] Appl. No.: 09/098,403

[22] Filed: Jun. 17, 1998

[51] Int. Cl.[7] ........................................... G06F 13/00
[52] U.S. Cl. .............................. 345/352; 345/348; 345/333
[58] Field of Search .................................... 345/352, 146, 345/343, 333, 335, 334

[56] References Cited

U.S. PATENT DOCUMENTS

| | | |
|---|---|---|
| 4,680,729 | 7/1987 | Steinhart . |
| 4,692,858 | 9/1987 | Redford et al. . |
| 5,041,967 | 8/1991 | Ephrath et al. . |
| 5,115,501 | 5/1992 | Kerr . |
| 5,220,675 | 6/1993 | Padawer et al. . |
| 5,261,042 | 11/1993 | Brandt . |
| 5,287,514 | 2/1994 | Gram . |
| 5,465,358 | 11/1995 | Blades et al. ............................ 345/339 |
| 5,644,737 | 7/1997 | Tuniman et al. ....................... 345/352 |
| 5,644,739 | 7/1997 | Moursund et al. ..................... 345/354 |
| 5,726,688 | 3/1998 | Siefert et al. .......................... 345/352 |
| 5,757,371 | 5/1998 | Oran et al. ............................. 345/348 |
| 5,760,768 | 6/1998 | Gram . |
| 5,825,357 | 10/1998 | Malamud ............................... 345/340 |
| 5,867,162 | 2/1999 | O'Leary et al. ....................... 345/352 |
| 5,897,670 | 4/1999 | Nielsen ................................... 345/334 |

OTHER PUBLICATIONS

Sybex; Microsoft Excel, 1994, Chapter 1.
"Intelligent Tool Tracker/Display IBM Technical Disclosure Bulletin", vol. 37, No. 2A Feb. 1, 1999, p. 175.
Steve Harris, et al. "Inside WordPerfect 6 for Windows", New Riders Publishing, p. 1063, 1994.
"Suitable Icon" IBM Technical Disclosure Bulletin, vol. 39, No. 11, pp. 63–64, 1996.
*Microsoft® Works Reference,* Appendix E: Macros, ©Copyright Microsoft Corporation 1987, 1988, 1989, pp. 369–382.
*Microsoft Word User's Guide,* Version 5.0, ©Copyright 1991–1992 Microsoft Corporation, pp. 61–66.

*Primary Examiner*—Raymond J. Bayerl
*Assistant Examiner*—Tadesse Hailu
*Attorney, Agent, or Firm*—Jones & Askew, LLP

[57] ABSTRACT

Drop down menus provided by a computer program are provided in two states, a short menu state and a long menu state. When a user opens a desired menu, the menu opened will initially take the form of a short menu of executable commands which are a subset of the total number of executable commands available under the selected menu. The short menu may be dynamically expanded into a long menu which will contain the complete set of executable commands available under the selected menu. The short menu may be adapted to the personal needs of the user when the user selects commands from the long menu which are not contained in the short menu. Usage information is stored and updated on the usage of each menu command added to a short menu. Menu commands are removed from the adapted short menus based on non-use of those menu commands by the user. Information stored, maintained, and updated on the usage of the menu commands added to the short menus is stored in a compact and efficient data structure which facilitates efficient computer memory use.

30 Claims, 7 Drawing Sheets

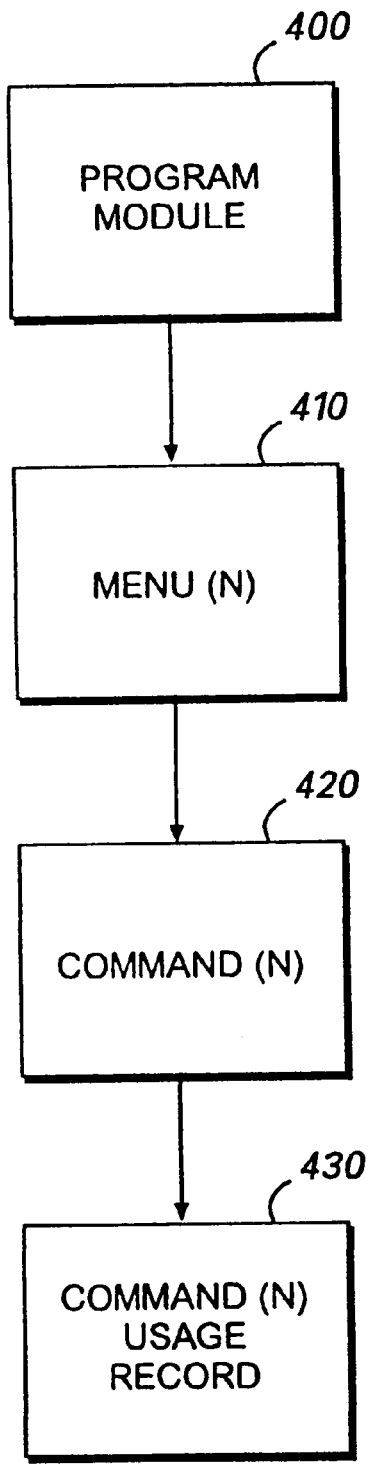
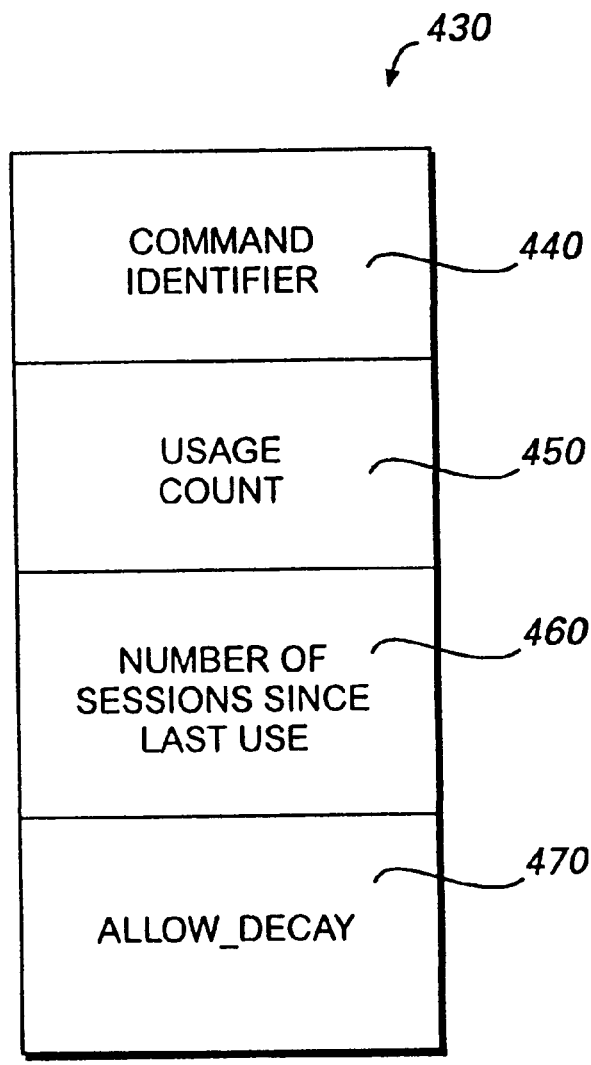
FIG.4A  FIG.4B

ADAPTIVE MENUS

TECHNICAL FIELD

This invention generally relates to computer program user interfaces and more particularly relates to dynamically increasing and decreasing the number of available commands in a shortened computer program menu based on the particular needs of a user of that program and based on the historical utilization of particular commands by a user of that computer program.

BACKGROUND OF THE INVENTION

In recent years, use of computers has increased dramatically worldwide. Users of computers utilize computer programs for a variety of purposes including word processing, data base management, desktop publishing, and the like. In order to facilitate more efficient utilization of computer programs, a variety of commands is typically provided in each computer program for allowing a user to manipulate data and text based on the particular application and the needs of the user. For example, a user of a word processing program may wish to open a variety of documents or files, edit those documents or files, and arrange the layout or print characteristics of text contained in those documents or files according to the particular needs of the user.

The available functionality of a computer application program is typically accessed by selecting commands within a menu displayed on a user interface of the application program. As designers of computer application programs provide more and more commands and menus, these menus become "cluttered" and confusing to users. This cluttering of menus with large numbers of commands (often not utilized by the user of the program application) is often referred to as "bloat."

Some application programs include the capability to use "short" sets of menus which expose only a subset of the available commands as opposed to "long" sets of menus which expose the full set of available commands in a particular menu. The content of such short menus is often predetermined and static. Because the commands available to the user in such short menus often are static, the user must either use the long menu or the preset short menu, but the user is incapable of changing the content of the short menu to provide a more desirable set of commands.

Some computer program applications allow the user to customize the menus and the commands that appear on the menus. This allows the advanced user to remove commands they do not use and add additional commands that the program designers did not place on the menus by default. This is normally done through a dialog which allows the user to drag unwanted controls off the menus. However, if the user ever wants one of the removed controls or commands back, the user must search for the desired control and add it back to the appropriate menu. Customizing the menus can be a complicated and confusing task. Unfortunately, most users either lack the sophistication to perform such menu customization, or they are afraid to delete currently unneeded commands or controls in the event that they might need those commands or controls at some point in the future.

Therefore, there is a need for a system and method for dynamically changing the available commands in a given short menu based upon the particular needs and utilization behavior of the user.

There is further a need for a system and method that can dynamically add to and subtract from available commands provided in a short menu without the need for the user to deliberately and manually select from a preset long menu or from a preset short menu.

There is further a need for a system and method for creating and updating a record of usage of menu commands added to a short menu where the record is compact and computer memory efficient.

SUMMARY OF THE INVENTION

The present invention satisfies the above-described needs by providing a system and method for dynamically changing the available commands in a given short menu based upon the particular needs and utilization behavior of a user. In general, drop down menus provided by a computer program are provided in two states, a short menu state and a long menu state. When a user opens a desired menu, the menu opened will initially take the form of a short menu containing a subset of executable commands of the total number of executable commands available under the selected menu. The short menu may be dynamically expanded into a long menu, which will contain the complete set of executable commands available under the selected menu.

Generally stated, the short menu may be adapted to the personal needs of the user when the user selects commands from the long menu which are not contained in the short menu. Usage information is stored and updated on the usage of each menu command added to a short menu. Menu commands are removed from the adapted short menus based on non-use of those menu commands by the user. Information stored, maintained, and updated on the usage of the menu commands added to the short menus is stored in a compact and efficient data structure which facilitates efficient computer memory use.

One aspect of the present invention provides a method for expanding a menu of a computer program module. A determination is made as to which commands should be included in a subset of multiple commands within a short form of the menu displayed on a display device. When an expansion action is detected, the short form menu is expanded by displaying a long form of the menu having each of the commands. In response to expanding the menu, other menus contained in the program module also can be expanded.

Various methods may be employed for use as expansion actions. The expansion action may include detecting the selection of an icon contained in the short form of the menu or detecting the hovering of a mouse controlled arrow or cursor over an icon contained in the short form of the menu. The expansion action may also include detecting the execution of a keyboard accelerator or detecting a mouse controlled double-click over a menu selection key. The expansion action may further include detecting the hovering of a mouse controlled arrow or cursor over the short form of the menu.

In another aspect of the present invention, a method of creating an adaptive menu of a computer program module is provided. A short form of the menu can be displayed on a display device, the short form having a subset of a group of commands. A need for an additional command not included in the subset of commands can be detected. In response, the short form of the menu can be expanded by displaying a long form of the menu having each of the group of commands. In response to selecting the additional command from the long form of the menu. The additional command can be added to the subset of the group of commands contained in the short form of the menu.

A first record can be created to document the number of times the additional command is selected. A count maintained in the first record can be incremented each additional time the command is selected. A second record also can be created to track the number of sessions the program module was used wherein the additional command was not selected. The second record is incremented for each time the program module is used and the additional command is not selected. The count in the first record can be decremented by "n" usage counts if the second record is incremented to represent a prescribed number of sessions during which the additional command is not selected. The additional command can be removed from the short form of the menu after the count in the first record is decremented to a prescribed number of usage counts. The prescribed number of usage counts is typically zero (0).

In another aspect of the present invention, a method of creating and updating an historical usage record for a command within a menu of a program module is provided. Generally, an historical usage record can be created, including a command identifier field, a usage count field, and a last session count field. The usage count can be incremented each time the menu command is selected from the menu. The last usage count can be incremented each time the program module is operated and the command is not selected for use. The usage count can be decremented by "n" usage counts if the last session count is incremented to a prescribed number of sessions during which the command was not selected. The historical usage record can be deleted if the usage count field is decremented to a prescribed number of usage counts. If desired, the historical usage record may include an Allow_Decay field. The Allow_Decay field may contain data determinative of whether the usage count should be analyzed.

In another aspect of the present invention, a computer-readable medium having stored thereon a data structure is provided. A first data field contains data representing a menu command of a program module. A second data field contains data representing a first number of executions of the menu command identified by the data contained in the first data field. A third data field contains data representing a number of sessions the program module containing the menu command has been operated during which the menu command was not executed. If data contained in the third data field is altered to represent a predetermined number of the sessions, the n in the data in the second data field is altered to represent a second number of executions of the menu command.

In another aspect of the present invention, a method for visually distinguishing commands in a menu of a program module is provided. Generally, a short form of the menu is presented on a display device, the short form having a subset of a group of commands the subset of commands contained in the short form of the menu is displayed in a first visual configuration. The short form of the menu can be expanded by displaying a long form of the menu, the long form having each of the group of commands. Each of the group of commands not included in the subset of commands can be displayed in a second visual configuration. The first visual configuration typically comprises a first color, and the second visual configuration comprise a second color.

Other objects, features, and advantages of the present invention will become apparent upon reading the following specification, when taken in conjunction with the drawings and the appended claims.

BRIEF DESCRIPTION OF THE DRAWINGS

FIG. 4A is a simplified block diagram illustrating the interaction of a computer program module with a given menu, a given set of commands within that menu and a command usage record for each of the given commands in accordance with an exemplary embodiment of the present invention.

FIG. 4B is a simplified block diagram illustrating the preferred data structure of the computer usage record of FIG. 4A in accordance with an exemplary embodiment of the present invention.

DETAILED DESCRIPTION OF THE DISCLOSED EMBODIMENTS

Figure 1:
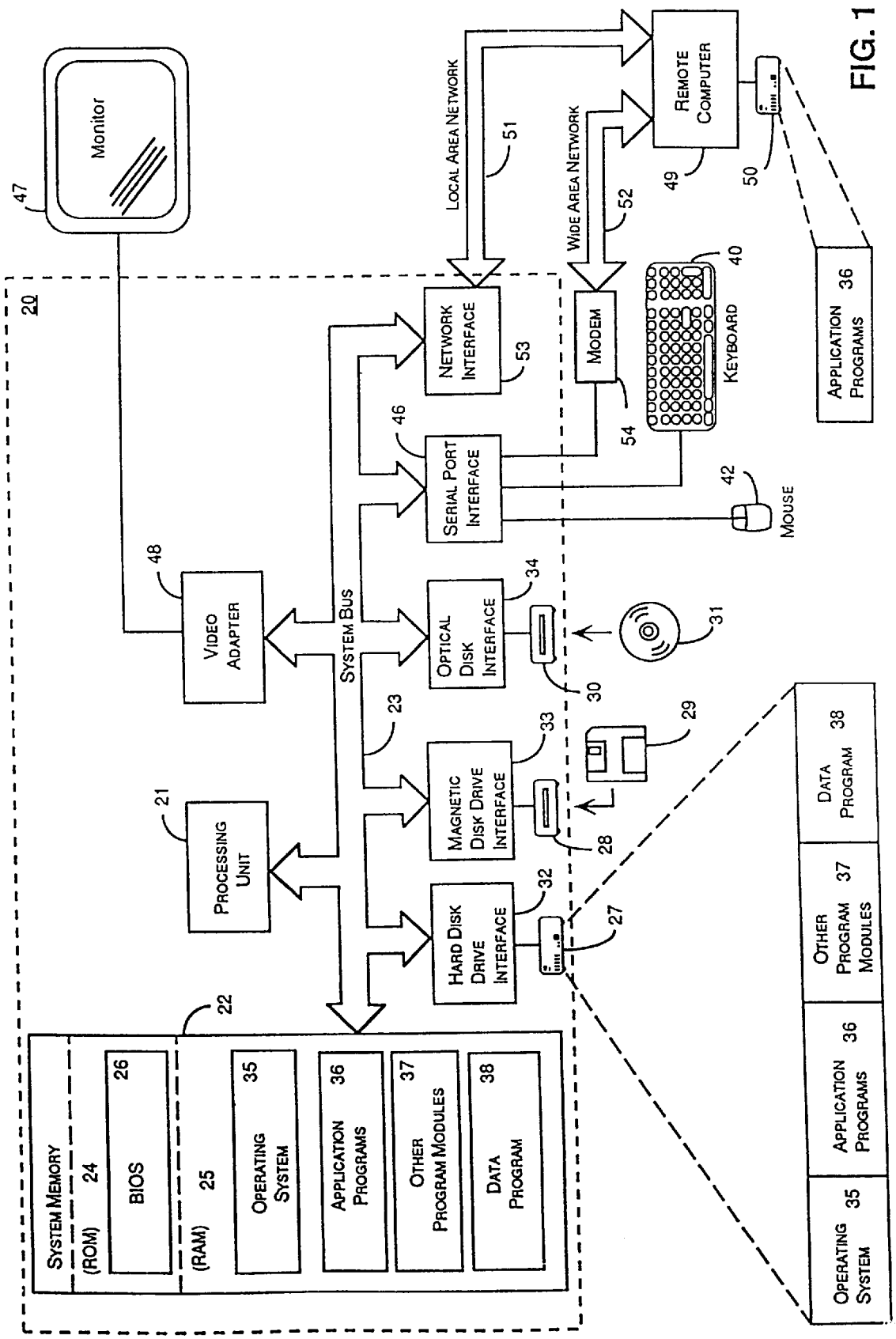
FIG. 1 is a block diagram of a personal computer that provides an exemplary operating environment for an embodiment of the present invention.

In accordance with an exemplary embodiment of the present invention, drop down menus for a computer application program can be provided in two states, a short menu state and a long menu state. When a user drops a desired menu onto the screen of the monitor of a computer, the menu dropped will initially take the form of a short menu of executable commands, which are a subset of the total number of executable commands available under the selected menu. As will be discussed below, the present invention provides the ability to dynamically expand the short menu into a long menu, which will contain the complete set of executable commands available under the selected menu.

The initial short menu provided to the user contains a set of executable commands predefined by the developer of the computer application program. When a user needs an executable command not included in the initial short menu, the short menu is expanded to the long menu state where the user will find the needed executable command. Once the user selects the needed executable command from the long menu, the present invention dynamically adds the selected executable command to the short menu to adapt the short menu to the personal needs of the user.

Once an executable command is added to the short menu to adapt the short menu to the user's personal needs, the present invention provides for monitoring the usage of the added executable command by the user. Subsequently, each time the user "boots up" the application program, the present invention provides for an analysis of the user's previous usage of the menu commands added to the short menu from the long menu. As the user's usage of menu commands which have been added to the short menu decreases or ceases, an exemplary embodiment of the present invention removes the added menu commands from the short menu in accordance with usage parameters as will be discussed in detail below. Additionally, the present invention maintains data on the user's usage of menu commands added to the short menu in a data structure which is compact and efficient and which saves memory space.

The detailed description which follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The processes and operations performed by the computer include the manipulation of signals by a processor or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, calling, comparing, receiving, sending, reading, transferring, determining, routing, selecting, transmitting, etc. which are often associated with manual operations performed by a human operator. The operations described herein are machine operations performed in conjunction with various input provided by a human operator or user that interacts with the computer.

Referring now to the drawings, in which like numerals represent like elements throughout the several figures, aspects of the present invention and the preferred operating environment will be described.

Exemplary Operating Environment

FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include routines, programs, components, data structures (such as tables or tree structures), etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from an optical disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage for the personal computer 20. Although the description of computer-readable media above includes the hard disk drive 27, a removable magnetic disk 29 and a removable optical disk 31, such as a CD-ROM disk or DVD, it should be appreciated by those skilled in the art that other types of removable media which are readable by a computer, such as magnetic cassettes, flash memory cards, digital tapes, Bernoulli cartridges, and the like, may also be used in the exemplary operating environment.

A number of program modules may be stored in the drives and RAM 25, including an operating system 35, one or more program modules 36 (such as a word processing program module), other program modules 37.

The operating system 35, in conjunction with the BIOS 26 and associated device drivers, provides the basic interface between the computer's hardware and software resources, the user, and program modules. A user may enter commands and information into the personal computer 20 through a keyboard 40 and an input or pointing device, such as a mouse 42.

Other input devices (not shown) may include a microphone, a key pad, a touch sensor, a joystick, a game pad, a satellite dish, a scanner, or the like. The keyboard 40, mouse 42, and other input devices are often connected to the processor 21 through a serial port interface 46, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections shown are exemplary and other means of establishing a communications link between the personal computer 20 and the remote computer 49 may be used.

Exemplary User Interfaces

Figure 2A:
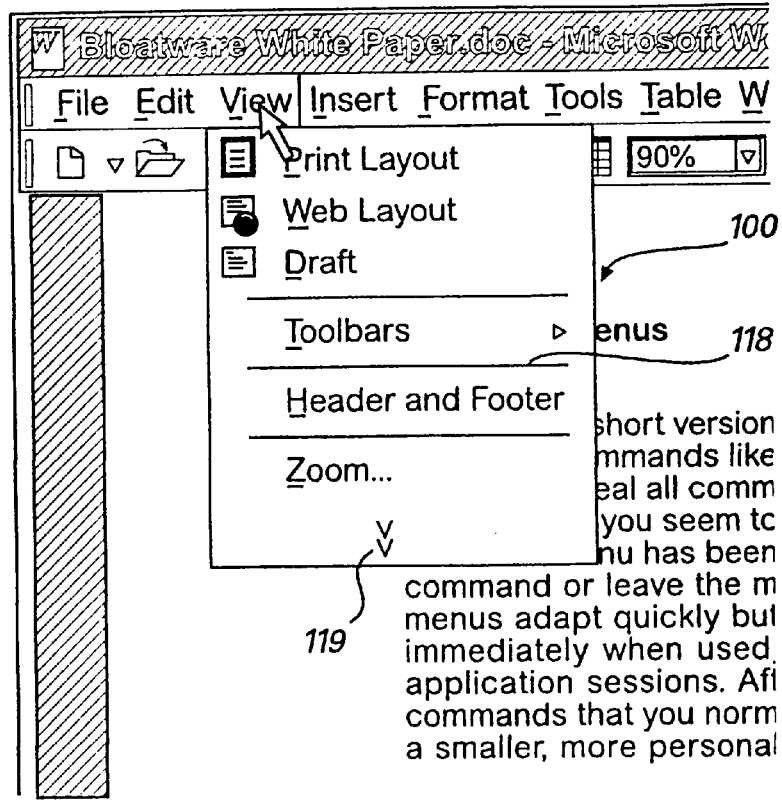
FIGS. 2A, 2B, 2C, and 2D depict illustrative computer programs screen shots according to an exemplary embodiment of the present invention.

Personalized adaptive short menus, as created in accordance with an exemplary embodiment of the present invention, act as caches of the menu commands that a user is likely to need. The commands the user is likely to need are the ones he or she has used before. In an exemplary embodiment of the present invention, fewer, more relevant menu commands are presented in each predefined short menu by default. The default setting of the menu commands presented in the short menu is predefined by the developer of a given computer application program, such as illustrated in FIG. 2A. As should be understood, the default setting initially may contain no commands, and the short menu may be filled with only those commands selected by the user from the corresponding long menu, as described below. Further, it should be understood, the default setting initially may contain all commands.

Once the user begins actual use of the computer application program, the short menus are personalized and adapted to fit the usage behavior of the individual user, as briefly described above. It should be understood, however, that while the short menus are not a replacement for the long menus which contain all available menu commands, an exemplary embodiment of the present invention provides for the presentation of the short menus by default until the user effects an expansion from the short menu into the long menu, as described above. Thus, the present invention reduces the "bloat" phenomenon characteristic of numerous and often superfluous menu commands located in the full length long menus.

During use of the default short menus or the adapted short menus, the user does not have to think about the menus. The user simply uses the short menus which typically will have exactly the menu commands he or she needs. The menu commands found on the adapted short menus will be familiar to the user and will be easy to browse. This aspect of the present invention allows the user to be in better control of the computer application program he or she is using. However, if the user does need to find a new menu command or would like to browse some menu command that he or she has not used in a while, the menus easily expand from the default or adapted short menu to the long menu to facilitate the user's needs.

As briefly described above, the present invention provides a method and system for allowing a user to dynamically expand a preset short menu of commands to a long menu of commands when the user desires or needs commands not present in the short menu of commands. Before describing the particular implementation of the present invention, it is advantageous at this point to describe a set of exemplary user interfaces encountered by a user of a given computer application program employing an exemplary embodiment of the present invention. FIGS. 2A, 2B, 2C, and 2D depict illustrative computer program display screens according to an exemplary embodiment of the present invention.

Referring to FIG. 2A, a user of an exemplary word processing program on his or her computer 20 selects and opens a view menu 100 in the word processing program. As shown in FIG. 2A, the view menu opened by the user is the short menu form of the view menu and typically contains only a few commands, such as the print layout command, the web layout menu, the draft command, the toolbar command, etc. The view menu 100 thus opened by the user represents a short menu containing the preset or default number of commands illustrated in FIG. 2A. For purposes of illustration, the user of the present word processing program begins to read the menu illustrated in FIG. 2A to find the "ruler" command, but the user is unable to find that command in the short menu.

After a brief delay, the user is unable to find the ruler command in the short menu illustrated in FIG. 2A. The user expands the short menu to a long menu 110 illustrated in FIG. 2B. As will be discussed in detail below, the user may expand from the short menu 100 illustrated in FIG. 2A to the long menu 110 illustrated in FIG. 2B manually, or the menu may be expanded automatically by the computer application program using a variety of intelligent methods or rules, as will be more particularly described below. After the short menu 100 is expanded into the long menu 110 illustrated in FIG. 2B, the user finds the "ruler" command 115 listed below the "toolbars" command 116 in the long menu.

Figure 2B:
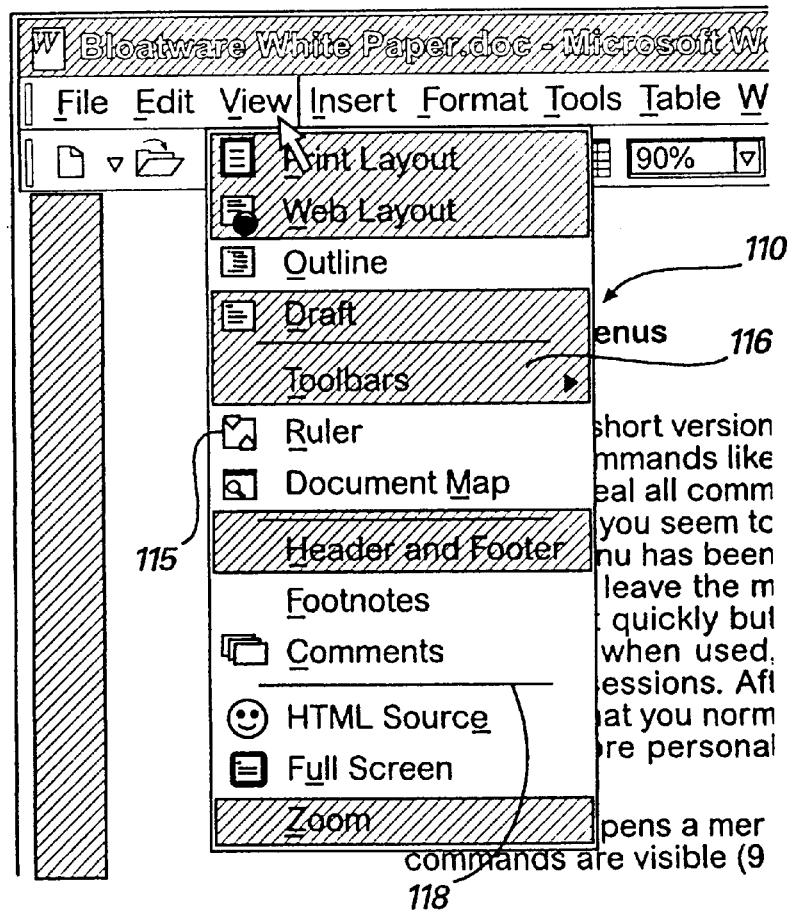

As shown in FIG. 2B, in an exemplary embodiment of the present invention, the commands provided in the long menu 110, which were not present in the short menu 100, are provided in a contrasting color scheme which presents the additional commands in a lighter and recessed visual appearance. This color/contrast scheme provides for a three dimensional visual appearance of the expanded long menu 110 whereby menu commands found on the long menu which are not included in the short menu 100 are contrasted to allow the user to quickly and efficiently detect menu commands which are present in the long menu 110, but which are not present in the short menu 100. An exemplary implementation of the color/contrast scheme, thus described, will be described in detail below.

Figures 2C, 2D:
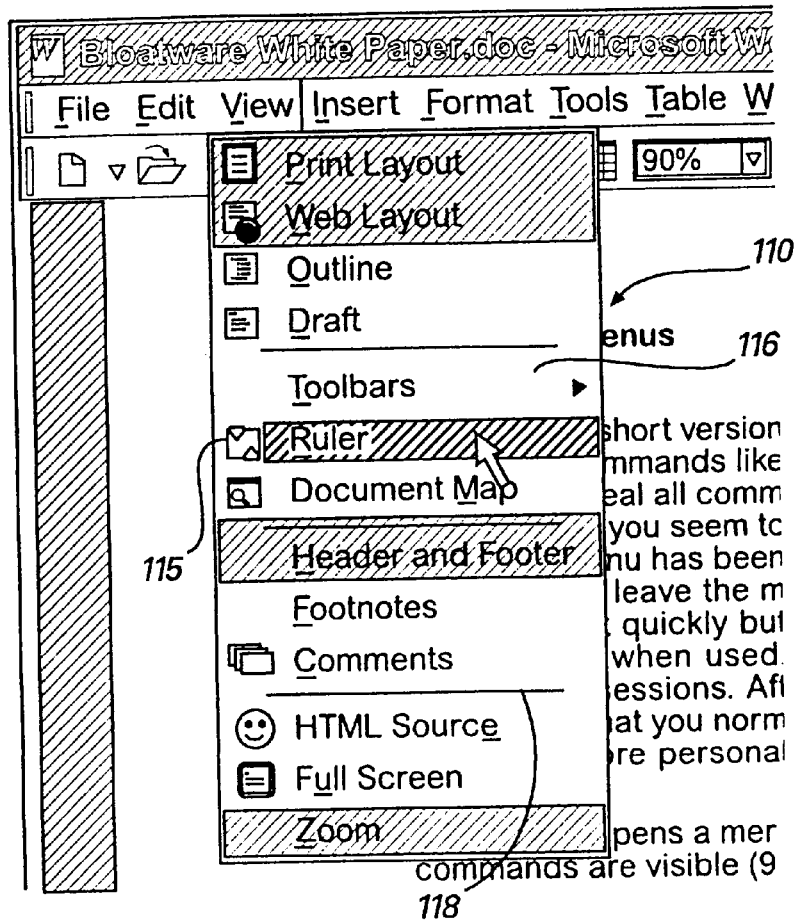

Referring now to FIG. 2C, the user having found the desired "ruler" command 115 in the long menu 110 illustrated in FIG. 2B, selects the "ruler" command for use, and the command executes accordingly. As should be understood by those skilled in the art, upon execution of the "ruler" command 115, the menu pulled down by the user will disappear back into a "hidden" state.

In accordance with an exemplary embodiment of the present invention, the "ruler" command 115 thus selected from the long menu 110 by the user will be added or promoted to the short menu of commands to create an adapted short menu 120, as illustrated in FIG. 2D. Accordingly, if and when the user returns to the view menu in order to turn off the "ruler" function, the adapted short menu 120, as illustrated in FIG. 2D, will appear and will contain the "ruler" command 115. The user will not be required to expand the adapted short menu 120 into the long menu 110 in order to find the "ruler" command 115 to turn off the "ruler" function. This aspect of the present invention allows the user to then use the adapted short menu 120 without confusion or without performing extra steps because the "ruler" command 115 now will be in the adapted short menu 120 pulled down by the user upon selection of the view menu. It should be understood that when the "ruler" command is promoted or added to the short menu, as described, it is added to the menu in a position relative to the other menu commands consistent with its position in the long menu.

It should be understood that creation of adaptive short menus as described herein can also be performed with respect to cascade menus. In an exemplary embodiment of the present invention, cascade menus are those sub-menus which are displayed when the user executes a given menu command within a given menu where that menu command provides a secondary or sub-menu of menu commands to the user. That is, such secondary menus or sub-menus, in accordance with an exemplary embodiment, are initially displayed as short menus which may be expanded and adapted as described for the primary menus initially selected by the user.

Many users utilize menus provided by computer application programs to browse the functionality or commands available in the application. The personalized adapted short menus created by the above-described process are optimized for a particular user, but in the case of the initial or default short menu 100, illustrated in FIG. 2A, or in the case of the "adapted" short menu 120, illustrated in FIG. 2D, all available commands are never present in the short menu unless all available commands are added to the adapted short menu 120, as described above. It should be understood, however, that nothing prevents the software application designer from defining the default short menu to actually contain all available commands, which commands may be deleted over time, as will be described below. Accordingly, it is important that users can and do find the long menus whenever commands on the long menus are needed. It is also important that the menus behave in a manner conducive to browsing when users want to browse a larger set of commands.

Figure 3:
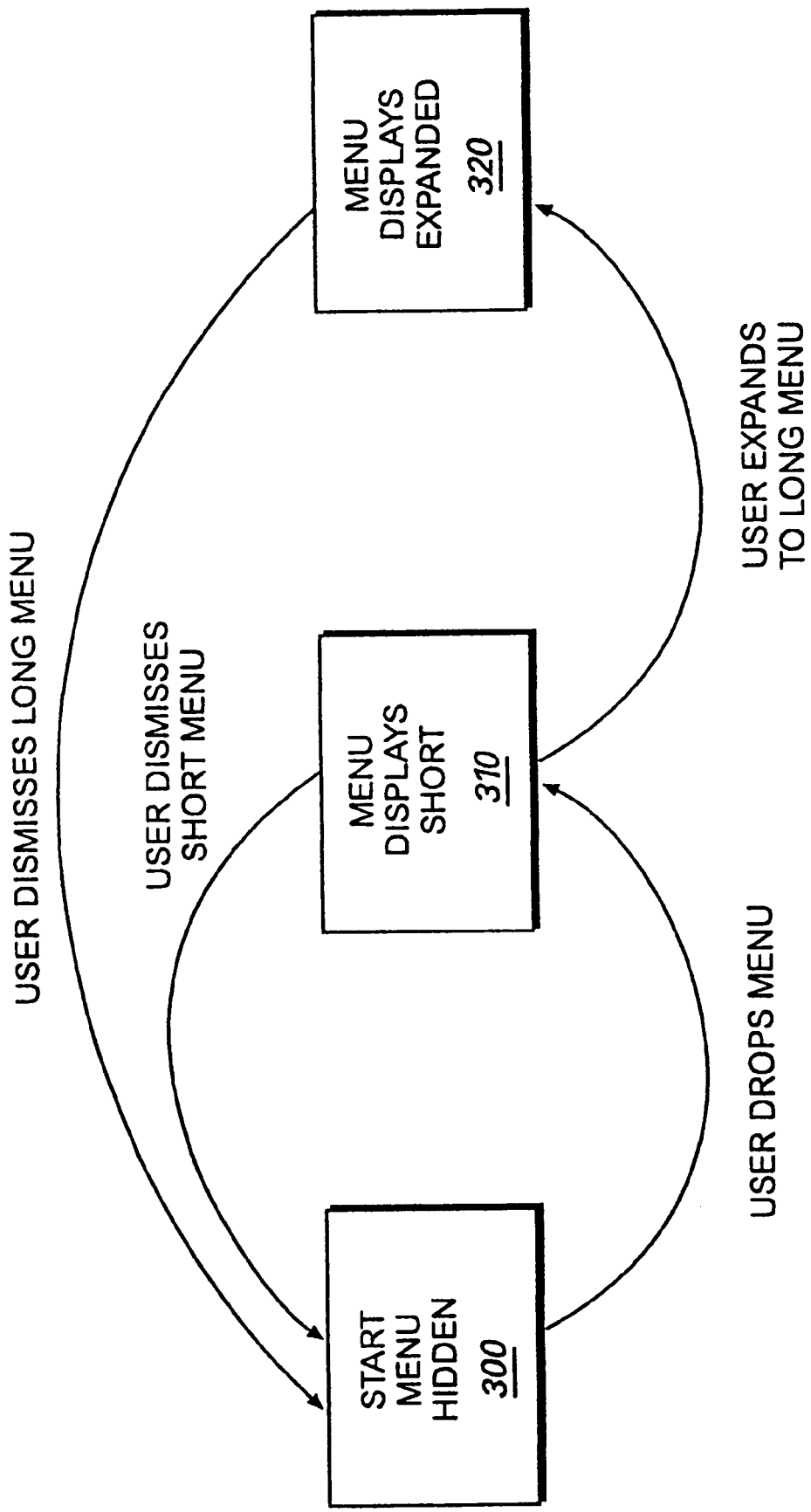
FIG. 3 is a state diagram illustrating an exemplary interaction between hidden menus, short menus, and long menus based upon utilization by the user of the computer program.

Referring now to FIG. 3, a state diagram is shown to illustrate an exemplary interaction between hidden menus, short menus, and long menus based upon utilization by the user of a given computer program. At state 300, a desired menu, such as the view menu 100 illustrated in FIG. 2A, is hidden prior to selection by the user. Once the user drops the selected menu (e.g., view menu) the default short menu 100 or subsequently adapted short menu 120 is displayed on the monitor screen of the user's computer 20 at state 310. If the desired menu command is available on the short menu, the user may execute the command and dismiss the short menu and return to state 300 where the short menu will return to the hidden state.

If at state 310 the user is unable to locate a desired menu command on the default short menu 100 or the adapted short menu 120, the user may manually expand the short menu into the long menu at state 320. As described in detail below, the short menu may be expanded into the long menu manually by the user or by a variety of "intelligent" methods provided by an exemplary embodiment of the present invention. Once the user expands the currently selected short menu into a corresponding long menu, all menus contained in the computer application program being utilized by the user will be expanded into corresponding long menus when they are dropped. If other menus are currently dropped, e.g., the user is in a cascade and expands that cascade while the parent menu is open, these other menus are not immediately expanded. Instead, all menus visited after that point will be dropped in an expanded mode.

It is advantageous to expand all available menus into corresponding long menus because the user has been unable to locate a desired menu command in the first selected short menu. Accordingly, it is helpful to provide the user with a full listing of all available menu commands from all available menus to prevent the user from needlessly searching through other short menus, expanding those short menus, and so on, until the user finds the desired menu command.

At state 320, the user finds the desired menu command and executes the command. Once the user executes the command, the long menu from which the user selected the desired command will be dismissed back to the hidden state at state 300, as should be understood by those skilled in the art.

The methods utilized by the computer application program for constructing and drawing the menus, as illustrated in FIGS. 2A–2D, are well known to those skilled in the art. Generally described, once a menu is selected by the user, a flag is set to indicate whether the menu is to be short or long. The positioning of the menu commands, including visible characteristics, size, order, and the inclusion of separator bars 118, as illustrated in FIGS. 2A–2D, is determined. Next, the application program determines whether an icon, such as the chevrons 119 (FIGS. 2A and 2D) should be placed at the bottom of the menu depending on whether the menu is a short menu or a long menu. In an exemplary embodiment of the present invention, the chevrons 119 are used to indicate a short menu and are used in the process of expansion of the short menu to the long menu, as described below.

Next, the menu is drawn on the screen of the monitor of the user's computer 20. If the user expands a short menu to a long menu, the application program determines the position in the long menu at which additional menu commands will be added. In an exemplary embodiment of the present invention, additional menu commands presented in the long menu are added in predefined locations (as shown by the addition of the "ruler" command in FIG. 2B) as opposed to simply adding the additional menu commands at the bottom of the expanded long menu. Prior to drawing the expanded long menu, the chevrons 119 are hidden, and a bit is set to indicate that all other menus in the application program should be expanded when shown. It should be understood that this bit is reset upon return to the hidden state 300, shown in FIG. 3, so that upon the user's selection of subsequent menus, the default short menus or adapted short menus will be displayed initially.

As briefly described above, in an exemplary embodiment of the present invention, during drawing of the menu on the screen of the monitor of the user's computer 20, appropriate colors for menu commands displayed in the long menus can be selected so that the additional menu commands displayed in the long menu will appear in contrast to the original commands displayed in the corresponding short menu. As shown in FIG. 2D above, after a menu command has been added to the short menu for subsequent use by the user of the short menu, the color of the added menu command is adjusted so that the added menu command is no longer shaded and recessed relative to the original menu commands in the adapted short menu. For example, as shown in FIG. 2B, the "ruler" command is lighted to appear recessed relative to the menu commands originally presented in the short menu, but as shown in FIG. 2D, the "ruler" command is shaded or colored to match the color scheme of the other menu commands after the "ruler" command has been added to the adapted short menu 120. In addition, according to an exemplary embodiment, illustrated in FIGS. 2A–2D, separator bars 119 are maintained in the original relative positions through the expansion process and after the short menu 100 has been modified to the adapted short menu 120.

Expansion of Short Menus to Long Menus

As briefly described above, the user may expand from a given short menu provided by the computer application program, as illustrated in FIG. 2A, to a long menu, as illustrated in FIG. 2B, manually, or the short menu can be automatically expanded based on detecting the searching behaviors of the user.

In an exemplary embodiment of the present invention, explicit and implicit triggers are provided to expand a short menu to a long menu. The user can immediately open a long menu if he or she desires to see the commands that are available. Alternatively, the user may begin looking for a particular command in the short menu and, in response to detecting the searching behavior of the user, the long menu can be automatically opened for the user. As described above, once any short menu has been expanded to the long menu, all short menus provided by the computer application program are expanded to long menus until the user successfully executes a command or aborts the search. The search is considered aborted when a user changes focus off the current menu bar for the menu in which the user is browsing. That is, a user can browse different commands within a given menu such as "File" or "Edit" without aborting the search and resetting. The search will be aborted only if the user changes focus off the menu bar for the menu in which the user is browsing.

In order to effect a manual expansion from a short menu to a long menu, as illustrated in FIGS. 2A and 2B, an exemplary embodiment of the present invention provides an explicit visual trigger at the bottom of each menu for activating the long menus. As illustrated in FIG. 2A, in an exemplary embodiment, a pair of chevrons 119 are provided at the bottom of the short menu 100. During browsing of the short menu 100 by the user, the chevrons 119 highlight when the user moves a mouse directed arrow or a cursor over the chevrons. Clicking the user's mouse on the chevrons 119 or depressing a carriage return or other suitable command will expand the short menu 100. As shown in FIG. 2B, in an exemplary embodiment, the chevrons 119 are not displayed once all items of the long menu are displayed. Other explicit triggers include Ctrl+Down Arrow and double clicking on the menu control, i.e., File or Edit.

The present invention also provides for implicit triggers which cause short menus to "intelligently" expand automatically. A variety of implicit triggers may be utilized to "intelligently" expand the short menus automatically. In an exemplary embodiment, implicit triggers for automatically expanding the short menus may include the following. The user may use a keyboard accelerator (e.g., "alt-F;O" for the file open command) which will cause the short menu to automatically expand to a long menu if there are two or more commands on the "F" menu that have the "O" shortcut and one or more of these commands is not on the short menu. The user may double click on a hidden menu to drop a long menu directly. The user may move the arrow or cursor down to the last menu item on the short menu to effect an expansion of the short menu into the long menu. The user may hover the arrow or cursor over the chevrons 119, as shown in FIG. 2A, for a predefined delay period to effect an expansion from the short menu to the long menu.

In addition, to the above described implicit triggers, the following "intelligent" methods also may be used to expand the short menu into the long menu. The user may hover the arrow or cursor on a given short menu key (e.g., the view key) without clicking, entering the view key, or leaving the view key, and the short menu will automatically expand into the long menu. The user may slowly drop a first menu, then proceed to a second menu, then proceed to a third menu, or back to the first or second menus to effect an expansion from the short menu to the long menu. The user may drop a given menu, roll the menu up and drop it again, without leaving the present menu or dropping another menu to effect an expansion from the short menu to the long menu. It should be understood that the foregoing brief description of explicit and implicit triggers for expanding the short menu into the long menu are exemplary in nature and do not represent an exhaustive listing of all available methods for expanding the short menu into the long menu.

Implementation of an Exemplary Embodiment of the Present Invention

The number of menu commands presented in each short menu depends in the first instance upon the number of commands predefined in the short menu by the developer of a given computer application program. During operation, however, the menu commands presented in each short menu depend on the user's usage patterns such that menu commands used by a given user will be added to the predefined short menus to adapt the short menus for personalized use by the user. As a user utilizes the computer application program, the menu commands saved to a given short menu will change over time based on the varying usage behavior of the user. In an exemplary embodiment, promotion of a menu command from a long menu to a short menu for subsequent use by the user is done quickly and efficiently. Demotion of an added menu command from the short menu back to the long menu after a user fails to use the added menu command over a given number of uses of the program is performed at a slower pace so that menu commands utilized by the user will not drop from the adapted short menus too quickly which might confuse the user.

Referring now to FIG. 4A, a simplified block diagram is shown to illustrate the interaction of a computer program module with a given menu, a given set of commands within that menu and a command usage record for each of the given commands in accordance with an exemplary embodiment of the present invention. As shown in FIG. 4A, a representative relationship of the components utilized in an exemplary embodiment of the present invention is illustrated.

Block 400 represents an application program utilized by the user to perform a given task. For example, the program module represented by block 400 may be a word processor program such as Microsoft® Word. Block 410 represents one of the set of menus(n) provided by the program module 400 where "n" represents the total number of available menus. Block 420 represents menu commands(n) provided by menu(n) 410 where "n" represents the total number of menu commands provided under menu(n) 410. The command usage record 430 represents a data record created and maintained by the application program in accordance with an exemplary embodiment of the present invention for containing information relevant to the user's usage of a particular menu command. As discussed in detail below, an exemplary embodiment utilizes command usage information contained in the command usage record 430 for determining if and when a menu command added to a given short menu should be deleted from the short menu. This can occur due to a failure to use that menu command by the user after a given number of sessions during which the user utilizes the application program containing that menu command.

FIG. 4B is a simplified block diagram illustrating the preferred data structure of the computer usage record of FIG.

4A in accordance with an exemplary embodiment of the present invention. As shown in FIG. 4B, the data structure of the command usage record 430 preferably contains four data fields. The data field 440 contains information which identifies the particular menu command (e.g., "ruler" command) for which the command usage record 430 is used to maintain information. The data field 450 contains a current count of the usage by the user of the particular menu command (e.g., "ruler" command). The data field 460 contains information regarding the number of sessions of use of the application since the command was last used by the user of the application program. For purposes of this description, this field is sometimes identified herein as the "last session used field." Finally, the data field 470 contains information used by the computer application program in determining whether to decrement or "decay" the usage count information contained in the data field 450, as will be more fully described below.

In an exemplary embodiment, a use session is some set period of time during which the application program is run. In a particular embodiment, a session is defined as at least one application "boot-up" and at least one twelve hour usage interval. That is, if the application program is booted up and run for twelve hours, that will equal one session. If the application program is booted up, shut down, and booted up again numerous times during a twelve hour period, that will still equal one session. This feature simplifies analysis of the use of a particular menu command without regard to the number of specific times during a given period in which the user starts and stops use of the application program. However, it should be understood that, if desired, a session may be defined as actual uses of the application program (e.g., 4 uses equals 4 sessions). Alternatively, a session may be defined as a number of uses of the application program during a specified period of time (e.g., 4 or more uses of the application in any 12 hour period equals 1 session).

In an exemplary embodiment, the command usage record 430 is compacted to contain only four (4) bytes, 31 bits, of data in order to save valuable memory space. The data field 440 in which information is stored for identifying the particular menu command, is preferably set to contain a maximum of sixteen (16) bits of information. The data field 450 in which the usage count of the particular menu command is stored is set to contain a maximum of ten (10) bits of information. The data field 460 in which the last usage count is stored is set to contain five (5) bits of information. Finally, the data field 470 contains one (1) bit of information. As is well known to those skilled in the art, this four (4) byte configuration of the command usage record 430 is advantageous because the four (4) byte configuration allows for more efficient use of the command usage record 430 by the operating system of the user's computer 20.

An exemplary embodiment of the present invention increments the usage count and last session used data fields of the command usage record 430 in accordance with the usage behavior of the user of the menu commands. As should be understood by those skilled in the art, as the usage count and last session used numbers increase, it is possible for those numbers to become too large to fit within the ten bit and five bit, respectively, data capacities described above. Accordingly, a normalization process can be performed when the numbers in those data fields become too large for the predefined bit capacities.

For example, if the usage count reaches a number which is too large for the ten bit data field 450 (e.g., 1,000 counts) that usage count will be decreased by some predefined percentage, such as 10%. That is, when the usage count reaches a number of 1,000 counts, in accordance with the present example, the usage count will be decreased by 10% to a number of 900 counts. However, as described below, because the usage count is used to determine when menu commands added to the short menus should be dropped from the short menus, this normalization process must be carried out across all data fields and all command usage records contained in the application program. That is, if the usage count in the data field 450 is reduced from 1,000 actual counts to 900 counts in order to keep the number within a range which will fit within the ten bit data parameter, the usage count information in all command usage records maintained and updated in the application program will be decreased by 10% in order to maintain relativity between the usage counts of the various menu commands on which usage information is being recorded. This aspect of the present invention prevents a particular menu command from being downgraded relative to other menu commands due to the normalization process.

As described above, menu commands are added to the short menus upon selection of additional menu commands from the corresponding long menus in order to adapt the short menus to the personal usage needs of the user. After menu commands are added to the short menus to adapt the short menus to the personal usage needs of the user, an exemplary embodiment provides for recording and updating usage data on the user's subsequent usage of menu commands which have been added to the short menus.

Figure 5:
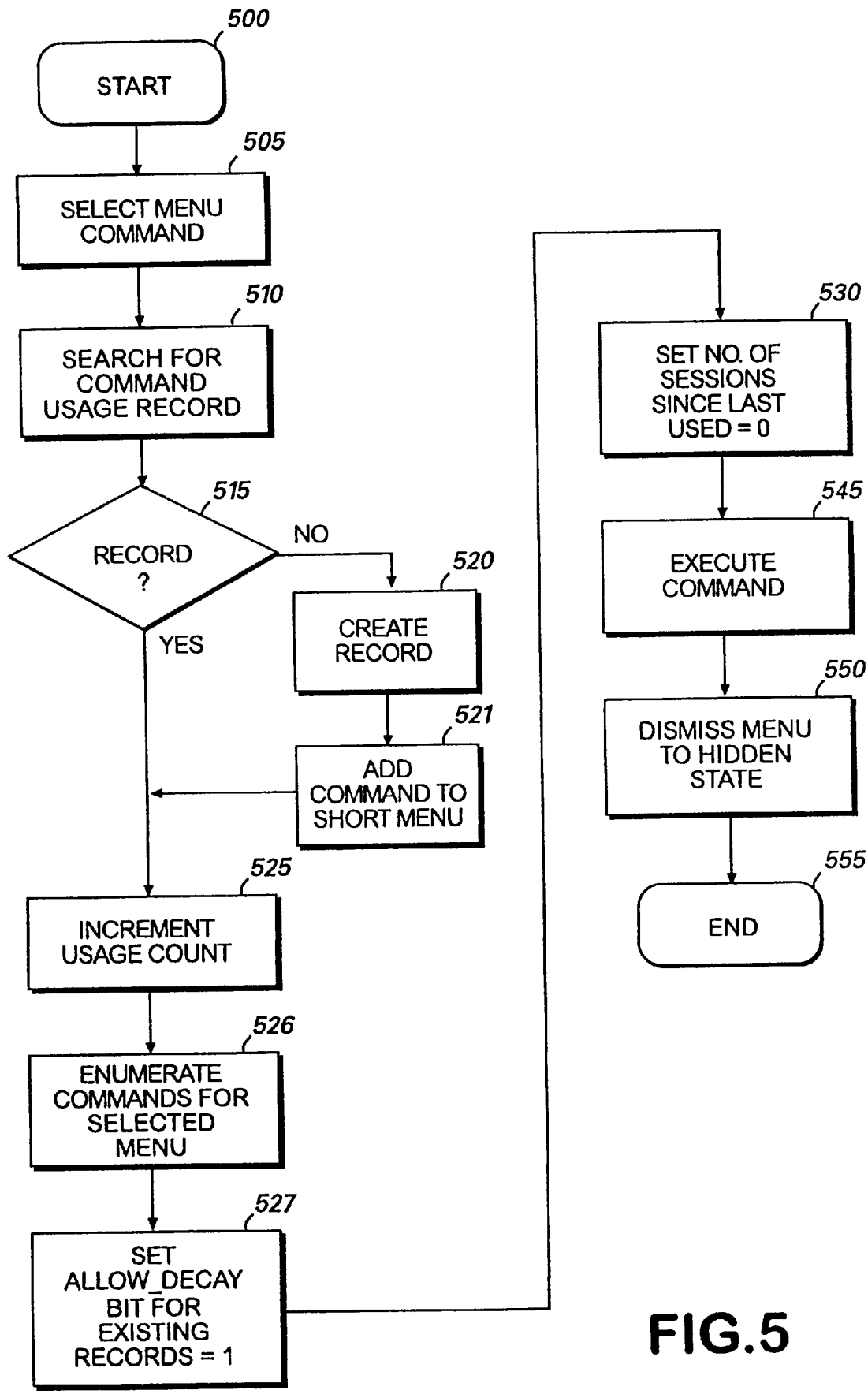
FIG. 5 is a flow diagram illustrating the preferred steps for updating the command usage record of FIG. 4B and of adding commands to an exemplary short menu in accordance with the present invention.

Referring now to FIG. 5, a flow diagram is presented to illustrate the steps for updating the command usage record of FIG. 4B and of adding commands to a short menu in accordance with an exemplary embodiment of the present invention. In particular, the steps illustrated in FIG. 5, are performed by an exemplary embodiment of the present invention after states 310 and 320 described above. As should be understood by those skilled in the art, other suitable methods may be used to update the command usage record 430 and for adding commands to a short menu.

At step 500 the method begins and moves to step 505. At step 505 the user selects a particular menu command from a short menu the user has dropped onto the screen of the monitor of his or her computer 20, as illustrated in FIG. 2A above. It should be understood that step 505 is also illustrative of a menu command selected by the user from a long menu at state 320, illustrated in FIG. 3.

At step 510, a search is performed for a command usage record 430 corresponding to the menu command selected by the user. At step 515, a determination is made whether a command usage record 430 exists for each command available on the menu dropped by the user. In accordance with an exemplary embodiment, commands having command usage records 430 will be on the selected short menu. Additionally, in accordance with an exemplary embodiment, the menu commands added to a short menu as a part of an initial short menu predefined by the developer of the computer application program will have command usage records where the usage counts and last session used counts are set to zero (0).

Commands which have not been added to the selected short menu will not have command usage records 430. However, if desired, in accordance with an alternative embodiment, a menu command could be placed on a short menu as a part of the initial set-up of the short menu by the program developer, and that menu command would not have a command usage record until after the first use of that menu command from the corresponding short menu. Continuing with the present flow diagram, if no command usage record 430 exists for the specific command selected by the user at step 505, a command usage record 430 is created at step 520.

At step 521, the command selected by the user is added to the corresponding short menu if it is not already present on the short menu and now that the command has a command usage record 430. If at step 515 a determination is made that a command usage record 430 does exist for the selected menu command, or if a command usage record 430 is created at step 520, the usage count field 450 of the command usage record 430 is incremented by one (1) at step 525.

At step 526, all commands available on the selected or "dropped" menu are enumerated. At step 527, the Allow_Decay bit represented by data contained in the data field 470 is set to "1" for "true" for each command that has an existing command usage record 430 with a usage count that has been incremented by at least one (1) at step 525. That is, as described above, any command menu command that is on the short menu, but which has not been accessed by the user will have a usage count equal to zero as a default setting. The operation of the Allow_Decay bit is described below.

At step 530, the last session used field 460 of the command usage record 430 is set to zero (0). In an exemplary embodiment, a last session used field set to zero indicates the last session used is the current session or that no sessions have occurred during which this command was not used. At step 545, the command selected by the user is executed. At step 550, the menu opened by the user will be dismissed upon execution of the selected command and the menu will return to the hidden state 300, as illustrated in FIG. 3.

As described in detail above, if the selected command is added to the short menu at step 521, the selected command will be added to the short menu to adapt the short menu to provide the selected command to the user upon subsequent opening of the short menu. Thus, in accordance with the foregoing steps and as described above, each time the user selects a desired menu command, that menu command will be added to the short menu if it is not presently on the short menu when selected by the user, and the usage count field 450 and last session used field 460 of the command usage record 430 will be incremented and updated, respectively.

In accordance with an exemplary embodiment of the present invention, each time a user subsequently "boots up" a given application program, the present invention provides for an analysis of the usage data recorded and updated in accordance with the user's usage of menu commands added to the short menus, as described above. As the user's usage of menu commands added to the short menus decrease or cease over time in terms of numbers of sessions of use of the application program wherein the added menu commands are not used, the present invention provides for a "decaying" or decrementing of the usage count data stored in the command usage record 430.

Once the usage count is decremented or decayed to a prescribed count (e.g., zero) in this manner, the command usage record for the particular menu command is removed, and likewise, the corresponding menu command is removed from the short menu. While menu commands selected by the user from the long menus are automatically added to the short menus, as described above, this aspect of the present invention allows for a slower removal of menu commands from the short menus to avoid confusing the user as to the contents of the short menu.

In order to effect this slower removal of menu commands from the short menus, as described, menu commands can be removed from the short menus in terms of the user's failure to use or cessation of use of menu commands added to the short menu in terms of elapsed sessions of use of the application program wherein the user does not make use of menu commands added to the short menus. For example, if the user uses a particular database program one session per day, the user is likely to be very familiar with the menu commands which have been added to the short menus. Accordingly, after the user fails to use particular menu commands over several sessions of use of the data processing program, the user is not likely to be confused when unused menu commands are dropped from the short menus. However, if the user only uses the data processing program two sessions per year, the user may become confused if menu commands added to the short menus six months ago at the time of the user's last session of use of the data processing program are dropped from the short menus upon "boot up" of the application program six months later. This undesirable situation is avoided by dropping menu commands from the short menus in terms of elapsed sessions of use of the application program in which the added menu commands are not used as opposed to dropping menu commands from the short menus in terms of elapsed time.

In an exemplary embodiment of the present invention, and as briefly described above, the Allow_Decay information represented by the one-bit data field 470 is used to prevent confusing removal of menu commands from a given short menu where those menu commands have not previously been accessed by the user. As described above, commands which are present on a short menu, but which have not been accessed will have command usage records with usage counts equal to zero. In accordance with an exemplary embodiment of the present invention, such a record would be deleted upon running of the program application based on its usage count of zero (0). To prevent this undesirable outcome, the Allow_Decay bit is set to an initial default setting of "0" for "false" which prevents removal of the menu command from the short menu. However, when the Allow_Decay bit is set to "1" for "true" a decaying of the usage count is allowed, and consequently, removal of a corresponding menu command is allowed.

For example, consider that the "help" command is placed on a given short menu as part of an initial set of commands designed by the program developer. In accordance with this example, consider that the "help" command has a command usage record 430 at the time of the initial set up of the short menu where the usage count is set to zero (0) because at the initial set-up of the short menu, the "help" command has not been selected. As a user drops the short menu, he or she sees the "help" command, but does not use it. However, the user becomes familiar and comfortable with the inclusion and location of the "help" command on that short menu. It would be undesirable to have the "help" command removed from the short menu based on those sessions in which the "help" command was not used.

Accordingly, as described above, the Allow_Decay bit for the "help" command will be set to "0" until the "help" command is accessed. As will be seen below, the system and method of the present invention will not analyze the usage count field for the "help" command as long as the Allow_Decay bit is set to "0." Consequently, the "help" command will not be removed from the short menu based on the elapse of sessions in which the "help" command is not used. In this manner, the user will not be confused by the removal of a command initially on the short menu, but not accessed by the user.

It should be understood that other suitable methods may be used to prevent the confusing removal of commands from short menus which commands have not been accessed by the user. For example, if desired, the Allow_Decay bit could be set to "0" until the elapse of a set period of time, such as two months. In this manner, an unused command would not be removed from a corresponding short menu until the user has used the program for the set period of time without accessing the particular command.

Figure 6:
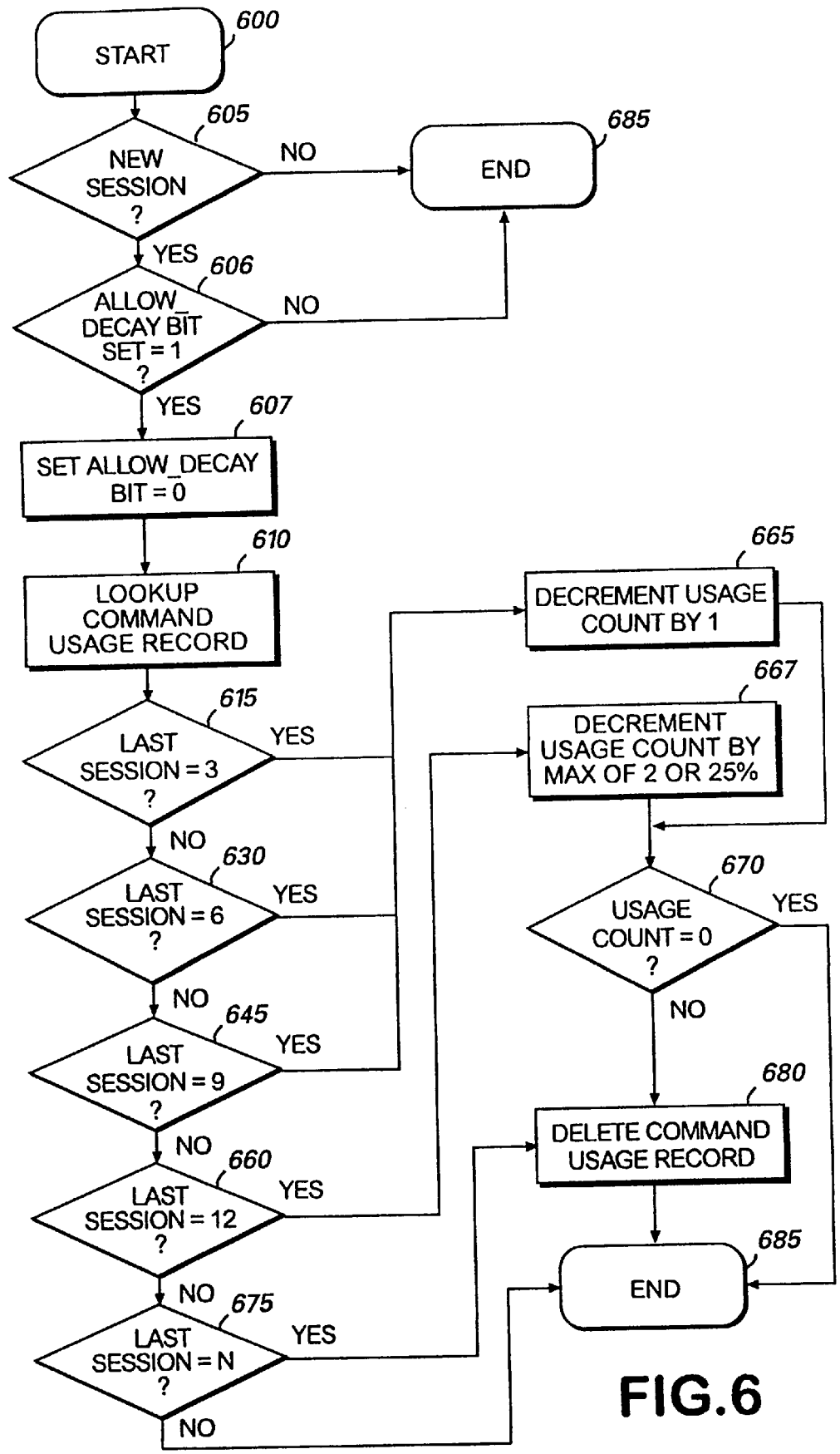
FIG. 6 is a flow diagram illustrating the preferred steps for reducing or decaying the usage count maintained in the command usage record and for deleting the command usage record if the usage count is reduced to a prescribed count.

Referring now to the drawings, FIG. 6 is a flow diagram illustrating the preferred steps for reducing or decaying the usage count maintained in the command usage record and for deleting the command usage record if the usage count is reduced to a prescribed count. At step 600, the method begins and moves to step 605. At step 605, a determination is made whether the application program is being used in a new session. As described above, in an exemplary embodiment, a session here is defined as any period of time equal to or exceeding twelve hours. Therefore, at step 605, a determination is made whether it has been twelve hours or more since the time at which the selected application program was last booted up. If the current session is not a new session, the analysis ends at step 685.

If it is determined that a new session is underway at step 605, a determination is made as to whether the Allow_Decay bit contained in the data field 470 is set to "1." As described above, if the Allow_Decay bit is set to "1" the method proceeds to analyze the usage count for each command contained in the menu currently selected by the user, if necessary. If the Allow_Decay bit is set to "0" for any particular menu command, the method does not analyze the usage count for that particular menu command, and therefore, the method ends at step 685 for that particular command. If the Allow_Decay bit is set to "1," the method proceeds to step 607 where the Allow_Decay bit is reset to "0" which is the normal default setting for the bit.

Next, the command usage record for each command contained in the application program and having an Allow_Decay bit set to "1" is looked-up at step 610. It should be understood that the analysis performed from this point forward is directed only to menu commands contained in the application program having an Allow_Decay bits set to "1." At step 615, a determination is made individually for each command usage record 430 for each such command as to whether the last session field 460 of the command usage record 430 is set to three (3). That is, a determination is made for each command as to whether any of the commands have not been used in the last three sessions. If it has been three sessions since a particular command has been used, the usage count field 450 of the command usage record 430 for that particular command is decremented by one (1) at step 665. If it has been anything other than three sessions since the last use of any particular command, the method proceeds to step 630.

At step 630, a determination is made individually for each command usage record 430 for each command as to whether the last session field 460 of the command usage record 430 is set to six (6). If it has been six sessions since a particular command has been used, the usage count field 450 of the command usage record 430 for that particular command is decremented by one (1) at step 665. If it has been anything other than six sessions since the last use of any particular command, the method proceeds to step 645.

At step 645, a determination is made individually for each command usage record 430 for each command as to whether the last session field 460 of the command usage record 430 is set to nine (9). If it has been nine sessions since a particular command has been used, the usage count field 450 of the command usage record 430 for that particular command is decremented by one (1) at step 665. If it has been anything other than nine sessions since the last use of any particular command, the method proceeds to step 660.

At step 660, a determination is made individually for each command usage record 430 for each command contained in the application program whether the last session field 460 of the command usage record 430 is set to twelve (12). If it has been twelve sessions since the last use of the menu command, then at step 667, the usage count is decremented by the maximum of two (2) or 25% of the total remaining usage count. If it has been anything other than twelve sessions since the last use of any particular command, the method proceeds to step 675. As should be understood, the intent of decrementing the usage count as thus far described is to slowly remove unused commands from short menus. This process is graduated in nature, because as can be seen, the number of usage counts decremented increases as the last session count increases.

As described, if the determinations at any of steps 615, 630, 645 or 660 is affirmative, the method proceeds to step 665, or 667 in the case of step 660, and the usage count is decremented as described. Continuing with the present flow diagram, at step 670, a determination is made whether the usage count is set to zero. If the usage count is now set to zero, the command usage record 430 for that particular menu command is deleted at step 680. As described above, deletion of the command usage record 430 for any menu command will remove the menu command from the short menu on which it previously has been added.

As set forth above, if at step 660 it has been anything other than twelve sessions since the last use of any particular command, the method proceeds to step 675. At step 675, a determination is made at whether "n" sessions have passed since the last use of the menu command. It should be understood by those skilled in the art that "n" sessions may be any number of sessions determined by the developer of the particular computer application program as a point at which the command usage record 430 for a given menu command should be deleted and the menu command deleted from its corresponding short menu.

In an exemplary embodiment of the present invention, "n" is set to thirty-one (31) sessions. Accordingly, at step 675 a determination is made whether it has been 31 sessions since the last use of the menu command being analyzed. If not, the analysis of the menu command ends at step 685. If it has been 31 sessions since the last use of the menu command, the command usage record 430 for that particular menu command is deleted at step 680.

It also should be understood from the foregoing description that other suitable parameters for decrementing the usage count may be utilized. For example, after the elapse of seventeen sessions without use of a given menu command which has been added to a corresponding short menu, the usage count may be decremented by the maximum of three (3) or 25% of the total usage count. After the elapse of twenty-three sessions, the usage count may be decremented by a maximum of four (4) counts or 50% of the total number of usage counts. It further should be understood that other methods of removing unused commands from the short menus may be employed. For example, the command usage record and corresponding command with the lowest usage count could be deleted at the beginning of any new session. The method described herein is exemplary in nature and is not intended as an exhaustive showing of all methods available for adding and removing commands from a short menu as described herein.

As described herein, the present invention provides for the presentation of short menus which are adaptive to the particular menu command usage behavior of users of a given computer application program. Usage information is stored and updated on the usage of each menu command added to a short menu in accordance with the present invention. Menu commands are removed from the adaptive short menus based on non-use of those menu commands by the user. Information stored, maintained, and updated on the usage of the menu commands added to the short menus, as described, is stored in a compact and efficient data structure which facilitates efficient computer memory use.

While this invention has been described in detail with particular reference to exemplary embodiments thereof, it will be understood that the variations and modifications can be affected within the spirit and scope of the invention as described herein and as defined in the appended claims.

What is claimed is:

1. A method for expanding a menu of a computer program module, comprising the steps of:
   (a) determining which of a plurality of commands is included in a subset of the commands;
   (b) displaying a short form of the menu, the short form containing the subset of the commands;
   (c) detecting an expansion action;
   (d) expanding the menu by displaying a long form of the menu, the long form of the menu having each of the commands; and
   (e) in response to expanding the menu, expanding each of a plurality of other short form menus contained in the program module into corresponding long form menus.

2. The method of claim 1, wherein the step of detecting an expansion action comprises detecting the selection of an icon contained in the short form of the menu.

3. The method of claim 1, wherein the step of detecting an expansion action comprises detecting the hovering of a mouse controlled arrow or cursor over an icon contained in the short form of the menu.

4. The method of claim 1, wherein the step of detecting an expansion action comprises detecting the execution of a keyboard accelerator.

5. The method of claim 1, wherein the step of detecting an expansion action comprises detecting a mouse controlled double-click over a menu selection key.

6. The method of claim 1, wherein the step of detecting an expansion action comprises detecting the hovering of a mouse controlled arrow or cursor over the short form of the menu.

7. The method of claim 1, further comprising the steps of:
   (f) determining the need for an additional command not included in the subset of commands;
   (g) selecting the additional command from one of the commands contained in the long form of the menu; and
   (h) adding the additional command to the subset of commands contained in the short form of the menu.

8. The method of claim 7, further comprising the steps of:
   (i) creating a first record having a count defining the number of times the additional command is selected from the short form of the menu after the step of adding the additional command to the subset of commands contained in the short form of the menu; and
   (j) incrementing the first record each time the additional command is selected from the short form of the menu.

9. The method of claim 8, further comprising the steps of:
   (k) creating a second record of the number of sessions since the program module was used; and
   (l) incrementing the second record for each time the program module was used wherein the additional command was not selected.

10. The method of claim 9, further comprising the step of:
    (m) decrementing the first record by "n" usage counts if the second record is incremented to a prescribed number of last sessions used during which the additional command was not selected.

11. The method of claim 10, further comprising the step of:
    (n) removing the additional command from the short form of the menu after the first record is decremented to a prescribed number of usage counts.

12. The method of claim 11, wherein the prescribed number of usage counts is zero (0).

13. A method of creating and updating an historical usage record for a command within a menu of a program module, comprising the steps of:
    (a) creating the historical usage record comprising a command identifier field, a usage count field, a last session count field, wherein the historical usage record further comprises an Allow_Decay field wherein the Allow_Decay field contains data determinative of whether step (d) is performed;
    (b) incrementing the usage count field each time the menu command is selected from the menu;
    (c) incrementing the last usage count field each time the program module is operated, wherein the command is not selected for use;
    (d) decrementing the usage count field by "n" usage counts if the last session used field is incremented to a prescribed number of last sessions used during which the command was not selected, wherein if the data contained in the Allow_Decay field is set to one (1), step (d) is performed and, wherein if the data contained in the Allow_Decay field is set to zero (0), step (d) is not performed;
    (e) deleting the historical usage record if the usage count field is decremented to a prescribed number of usage counts; and
    (f) resetting the last usage count field upon use of the command.

14. The method of claim 13, wherein the prescribed number of usage counts is zero (0).

15. The method of claim 13, wherein the step of decrementing the usage count field includes decrementing the usage count field by one usage count if the last session used field is at least equal to 3.

16. The method of claim 13, wherein the step of decrementing the usage count field includes decrementing the usage count field by one usage count if the last session used field is at least equal to 6.

17. The method of claim 13, wherein the step of decrementing the usage count field includes decrementing the usage count field by one usage count if the last session used field is at least equal to 9.

18. The method of claim 13, wherein the step of decrementing the usage count field includes decrementing the usage count field by the maximum of two usage counts or 25% of the total number of usage counts contained in the usage count field if the last session used field is at least equal to 12.

19. A computer-readable medium having stored thereon a data structure, comprising:
    (a) a first data field containing data representing a menu command of a program module;
    (b) a second data field containing data representing a first number of executions of the menu command identified by the data contained in the first data field; and (c) a third data field containing data representing a number of sessions the program module containing the menu command has been operated during which the menu command was not executed, wherein if data contained in the third data field is altered to represent a predetermined number of the sessions, the data in the second data field is altered to represent a second number of executions of the menu command.

20. The computer-readable medium of claim 19, further comprising:

a fourth data field containing data representing a determination of whether the data in the second data field is altered to represent a second number of executions of the menu command.

21. A computer-readable medium on which is stored a computer program for expanding a menu of a computer program module, the computer program module comprising instructions, which when executed by a computer, perform the steps of:

(a) determining which of a plurality of commands is included in a subset of the commands;

(b) displaying a short form of the menu, the short form containing the subset of the commands;

(c) detecting an expansion action;

(d) expanding the menu by displaying a long form of the menu, the long form of the menu having each of the commands; and (e) in response to expanding the menu expanding each of a plurality of other short form menus contained in the program module into corresponding long form menus.

22. The method of claim 21, further comprising the step of the step of detecting an expansion action includes detecting the selection of an icon contained in the short form of the menu.

23. The computer-readable medium of claim 21 on which is stored a computer program for creating an adaptive menu of a computer program module, the computer program comprising instructions, which when executed by a computer, further perform the steps of:

(f) determining the need for an additional command not included in the subset of commands;

(g) selecting the additional command from one of the commands contained in the long form of the menu; and (h) adding the additional command to the subset of commands contained in the short form of the menu.

24. The method of claim 23, further comprising the steps of:

(i) creating a first record of the number of times the additional command is selected from the short form of the menu after the step of adding the additional command to the subset of commands contained in the short form of the menu;

(j) incrementing the first record each time the additional command is selected from the short form of the menu;

(k) creating a second record of the last session the program module was used;

(l) incrementing the second record for each time the program module was used wherein the additional command was not selected;

(m) decrementing the first record by n usage counts if the second record is incremented to a prescribed number of last sessions used during which the additional command was not selected; and (n) removing the additional command from the short form of the menu after the first record is decremented to a prescribed number of usage counts.

25. A system for expanding a menu of a computer program module, comprising a control module operative (a) to determine which of a plurality of commands is included in a subset of the commands;

(b) to display a short form of the menu, the short form containing the subset of the commands;

(c) to detecting an expansion action;

(d) to expand the menu by displaying a long form of the menu, the long form of the menu having each of the commands; and (e) to expand each of a plurality of other short form menus contained in the program module into corresponding long form menus, in response to expanding the menu.

26. The system of claim 25 wherein the control module is further operative (f) to determine the need for an additional command not included in the subset of commands;

(g) to select the additional command from one of the commands contained in the long form of the menu; and (h) adding the additional command to the subset of commands contained in the short form of the menu.

27. The system of claim 26 wherein the control module is further operative (i) to create a first record having a count defining the number of times the additional command is selected from the short form of the menu after the step of adding the additional command to the subset of commands contained in the short form of the menu; and (j) to increment the first record each time the additional command is selected from the short form of the menu.

28. The system of claim 27 wherein the control module is further operative (k) to create a second record of the number of sessions since the program module was used; and (l) to increment the second record for each time the program module was used wherein the additional command was not selected.

29. The system of claim 28 wherein the control module is further operative (m) to decrement the first record by "n" usage counts if the second record is incremented to a prescribed number of last sessions used during which the additional command was not selected.

30. The system of claim 29 wherein the control module is further operative (n) to remove the additional command from the short form of the menu after the first record is decremented to a prescribed number of usage counts.

* * * * *